United States Patent
Thompson

(10) Patent No.: US 12,483,056 B2
(45) Date of Patent: Nov. 25, 2025

(54) CHARGING SYSTEM FOR PRIORITIZED POWER DISTRIBUTION AND DYNAMIC POWER ADJUSTMENT

(71) Applicant: LEANCODE, INC, Redmond, WA (US)

(72) Inventor: Bernard Thompson, Bellevue, WA (US)

(*) Notice: Subject to any disclaimer, the term of this patent is extended or adjusted under 35 U.S.C. 154(b) by 0 days.

(21) Appl. No.: 18/899,243

(22) Filed: Sep. 27, 2024

(65) Prior Publication Data
US 2025/0105648 A1    Mar. 27, 2025

Related U.S. Application Data

(60) Provisional application No. 63/658,061, filed on Jun. 10, 2024, provisional application No. 63/540,691, filed on Sep. 27, 2023.

(51) Int. Cl.
*H02J 7/00* (2006.01)

(52) U.S. Cl.
CPC ........ *H02J 7/00712* (2020.01); *H02J 7/0013* (2013.01)

(58) Field of Classification Search
CPC .................................. G06F 1/32; G06F 1/26
See application file for complete search history.

(56) References Cited

U.S. PATENT DOCUMENTS

| | | | | |
|---|---|---|---|---|
| 2006/0082222 A1* | 4/2006 | Pincu | ................ | G06F 1/3203 307/29 |
| 2007/0030613 A1* | 2/2007 | Sousa | ................ | H04W 52/281 361/92 |
| 2009/0100275 A1 | 4/2009 | Chang et al. | | |
| 2010/0106985 A1* | 4/2010 | Panguluri | ................ | G06F 1/266 713/300 |
| 2011/0040991 A1* | 2/2011 | Wu | ................ | G06F 1/3287 713/310 |
| 2015/0160674 A1* | 6/2015 | Burdette | ................ | G06F 13/385 700/295 |
| 2015/0263550 A1* | 9/2015 | Han | ................ | H02J 7/0013 320/108 |
| 2016/0336745 A1* | 11/2016 | Pandya | ................ | H02J 7/342 |
| 2018/0120913 A1* | 5/2018 | Vincent | ................ | G06F 1/3203 |
| 2018/0150121 A1* | 5/2018 | Basterash | ................ | H02J 7/0042 |
| 2019/0073012 A1 | 3/2019 | Sultenfuss et al. | | |
| 2020/0012326 A1* | 1/2020 | Steele | ................ | G06F 1/28 |

(Continued)

OTHER PUBLICATIONS

International Search Report And The Written Opinion of the International Searching Authority for PCT/US24/48946 established by the ISA/US completed on Nov. 27, 2024.

*Primary Examiner* — Phil K Nguyen
(74) *Attorney, Agent, or Firm* — Goldstein Law Offices, P.C.

(57) ABSTRACT

A system and method for intelligently managing and distributing power from a common power source to multiple Universal Serial Bus (USB) downstream ports. The system integrates dynamic power management capabilities that enable efficient use of the available power and ensure optimal performance of connected devices. The system acquires real-time power consumption data, including current sensing to measure real-time power consumption of the connected devices and provide system wide power monitoring, to provide port power renegotiation based upon the real-time power consumption.

7 Claims, 10 Drawing Sheets

(56) References Cited

U.S. PATENT DOCUMENTS

| | | |
|---|---|---|
| 2020/0303939 A1* | 9/2020 | Perry .................... H02J 7/0013 |
| 2021/0391716 A1* | 12/2021 | Giffen ..................... G06F 1/189 |
| 2021/0408803 A1 | 12/2021 | Natarajan et al. |
| 2022/0261369 A1 | 8/2022 | Frederick et al. |
| 2023/0409098 A1* | 12/2023 | Sivaramakrishnan ....................... G06F 1/3253 |
| 2024/0022102 A1* | 1/2024 | Notohamiprodjo ... G06F 1/3237 |

* cited by examiner

CHARGING SYSTEM FOR PRIORITIZED POWER DISTRIBUTION AND DYNAMIC POWER ADJUSTMENT

CROSS REFERENCES AND RELATED SUBJECT MATTER

This application is a non-provisional filing of provisional patent application Ser. No. 63/540,691, filed in the United States Patent Office on Sep. 27, 2023, and provisional patent application Ser. No. 63/658,061, filed in the United States Patent Office on Jun. 10, 2024.

TECHNICAL FIELD

The present disclosure relates generally to a system and method for prioritized intelligent power distribution and dynamic adjustment of power from a shared source across multiple USB ports. More particularly, the present disclosure relates to a system and method for intelligent power distribution that employs current sensing and system-wide power monitoring to renegotiate power allocation.

BACKGROUND

In the existing state of the art, several challenges and inefficiencies hinder the optimal distribution of power from a common source to multiple downstream USB ports.

Traditional power distribution systems often deliver power evenly across all downstream ports, irrespective of the actual power requirements of the connected devices. This leads to situations where some devices may receive more power than needed, wasting energy, while others might receive insufficient power, limiting their performance or even causing damage due to under-powering.

In conventional systems, power allocation to individual ports is typically fixed and lacks flexibility. This rigid approach does not account for variable power demands of different devices connected at different ports, leading to inefficiencies and potential risks of either overloading or under-utilizing the power source.

Existing systems often lack the ability to monitor the overall power consumption across all connected devices. Without this system-wide overview, it's challenging to ensure that the total power draw stays within the capacity of the power source, raising risks of overloading the source or negatively affecting the performance and lifespan of both the source and connected devices.

In addition, as charging devices approach full capacity, their current draw typically decreases. Accordingly, without a system-wide overview, it is not possible to know when more power is actually available and could be allocated to other devices.

Conventional systems generally do not have mechanisms for adjusting power allocation in real-time based on changes in the power demand of connected devices. This can lead to suboptimal power distribution, especially in scenarios where devices' power needs vary significantly over time.

A wide variety of systems have been proposed for managing power across multiple ports. While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a power distribution system that allows effective utilization of available power across multiple ports. Accordingly, systems, devices, and methods of the present disclosure aim to address these issues by introducing an intelligent power distribution system that incorporates current sensing, downstream port prioritization, dynamic power renegotiation, and system-wide power monitoring. These advancements are designed to optimize power distribution, improve energy efficiency, and enhance the overall performance and safety of systems with multiple USB ports powered by a common USB power source.

It is another aspect of an example embodiment in the present disclosure to prioritize power delivery among the ports, to ensure that the highest priority devices receive full power, to recognize when additional power is available, and then to provide power to lower priority ports. Accordingly, in certain embodiments, ports are prioritized from left to right. The ports on the left are provided power first. When additional power is available, ports further to the right are served.

It is another aspect of an example embodiment in the present disclosure to provide USB power delivery negotiation. The system starts with a negotiation process with the power source using USB Power Delivery protocols. This negotiation process determines the total system power budget, i.e., the maximum power the source can deliver. This value sets a hard limit on how much power can be distributed across all USB ports.

It is yet another aspect of an example embodiment in the present disclosure to provide current sensing to determine actual power draw of the devices connected to the ports in real-time. This provides a continuous stream of data about the power usage, giving the system an accurate understanding of power requirements and availability.

It is still another aspect of an example embodiment in the present disclosure to provide a system-wide controller. Current sensing data is sent to the controller. This controller collates and processes the data, providing an overview of the total power consumption across all ports and how it compares to the total system power budget.

It is a further aspect of an example embodiment in the present disclosure to provide dynamic power adjustment. Based on the data processed by the central controller, the system can dynamically adjust the power allocated to each port, and can allocate power to lower priority ports. This is achieved through USB Power Delivery negotiations with each downstream device, supplying an appropriate power level based on the device's current needs and the overall system power budget. If devices are using less power than initially allocated, the system can decrease the allocated power for that port and reallocate it to other ports. Conversely, if a device requires more power and the system has surplus power within the total budget, the system can increase the advertised power to that port, or take power away from lower priority ports.

Accordingly, the present disclosure describes a system that ensures that the total power draw from all USB ports never exceeds the system's total power budget. It achieves this by continuously monitoring and dynamically adjusting power allocations, keeping the system within its power budget while ensuring efficient power distribution tailored to the needs of each connected device. This results in improved energy efficiency and optimized device performance.

It is yet a further aspect of an embodiment in the present disclosure that the system recapture power allocation to a specific port when that port is using less power than initially allocated. Accordingly, in some embodiments, per-port current sensing allows the controller to detect when a port is drawing less current and therefore less power at the voltage associated with its present allocation. The system can decrease the allocated power for that port and allocate the power to a lower priority port.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
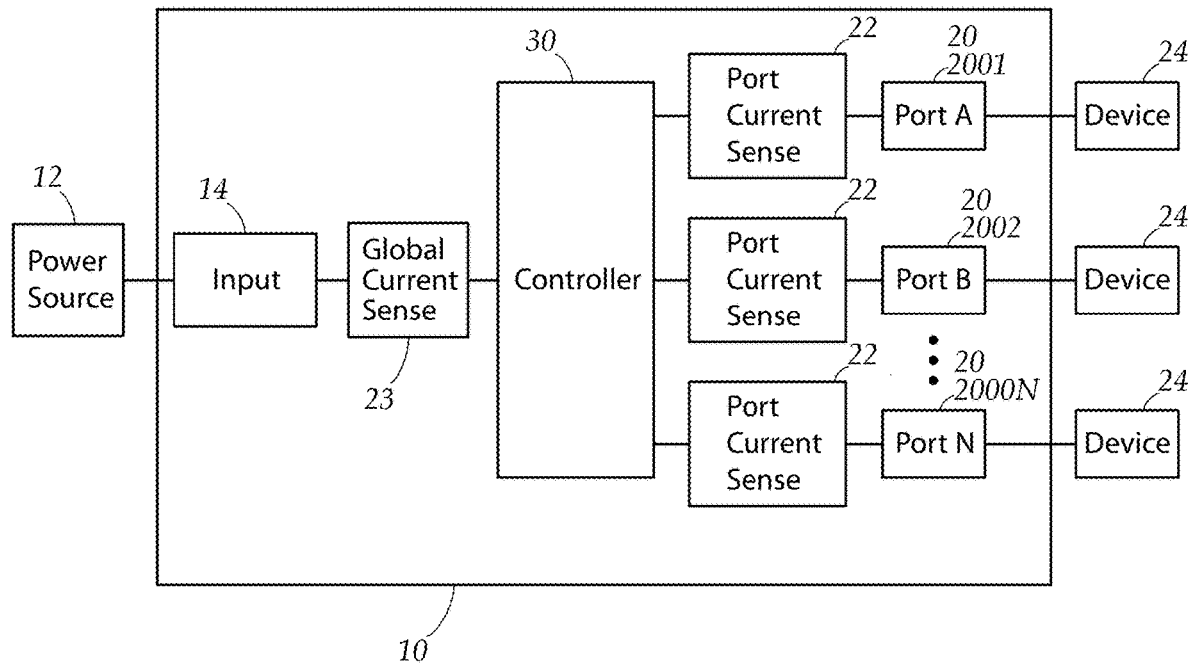
FIG. 1 is a block diagram, illustrating a prioritized power delivery system in accordance with the present disclosure

Illustrated in FIG. 1 is a priority power delivery device 10 having a controller 30, a power input 14, and multiple USB downstream ports 20. A common power source 12, generally external to the power management system 10, is connected to the power input 14 and provides power to the multiple USB downstream ports 20 through the controller 30. A plurality of external devices 24 are connected to the downstream ports 20. Each downstream port 20 features a port current sensor 22 which measures the power draw of any connected device 24 that is connected to said downstream port 20. A global current sensor 23 is connected to the power input 14 to measure the overall power draw to the power source 12. Data from the current sensors 22, 23 is relayed back to the controller 30. Additionally, the common power source 12 and the controller 30 communicate via a USB Power Delivery (USB PD) negotiation to establish the total system power budget.

In the preferred embodiment, the common power source 12 is connected to the controller via a USB Power Delivery interface. This power source could be any power-generating device, such as an AC/DC adapter, a power bank, or a renewable energy source like a solar panel, capable of supplying power to multiple devices simultaneously. The power source 12 is preferably, however, a USB power source.

The power from the source 12 is intended to be distributed across the multiple downstream USB ports 20, each capable of providing power to a connected downstream/external device 24. These ports could include various USB standard ports, such as USB Type-A, USB Type-C, or any other USB interfaces, based on the requirements or configuration of the downstream devices in need of connection, power supply, and charging.

To manage the distribution of power from the common source 12 to these USB ports, the controller 30 acts as a power manager, interfacing with both the power source 12 and the downstream USB ports 20 effectively supplied thereby.

Upon initialization, the controller 30 conducts a USB Power Delivery negotiation with the power source 12 to determine the total power budget available for distribution. The power source 12 communicates its maximum power capacity to the central controller via this negotiation, establishing a power delivery contract, and establishing the total power budget which is the limit of power that can be drawn across all downstream USB ports 20.

Once the total power budget is established, the central controller 30 proceeds to distribute power to the multiple USB ports. In the initial setup, the controller 30 is capable of evenly distributing the power among all ports 20 or allocate power based on other predefined parameters. However, in accordance with the principles of the present disclosure, the controller 30 allocates power in an orderly fashion: initially to a highest priority port 2001, and then to a next highest priority port 2002, until a lowest priority port 200N is served. The controller 30 then dynamically adjusts this distribution, which is discussed in further detail hereinbelow.

In summary, in the preferred embodiment, the common power source's energy is intelligently shared across multiple downstream USB ports 20 under the guidance of the central controller 30, maintaining a dynamic balance based on real-time power requirements and ensuring the total power draw stays within the system's power budget.

USB Power Delivery

USB Power Delivery (USB PD) is a protocol that allows for flexible, bi-directional power adjustments along a USB cable. This protocol is the backbone of how power is delivered from the common power source to the multiple downstream USB ports in this system.

Initially, the controller 30, equipped with USB PD capabilities, performs a power negotiation with the power source 12. This negotiation process allows the controller to understand the maximum power capacity of the power source 12, thereby establishing the total system power budget. This budget defines the allowable limit for the total power draw across all downstream ports 20.

Once the total power budget is set, the controller employs USB PD to distribute the power to the downstream ports, in order of prioritization. Each of these ports is also equipped with USB PD capabilities. Before power is delivered to a connected device 24 at each port 20, the controller 30 and the device 24 engage in a power negotiation. During this negotiation, the device declares its power requirements, and the controller allocates power to the device accordingly, provided the anticipated total power draw is within the total power budget.

Notably, USB PD's dynamic nature enables the controller 30 to readjust power allocations as needed. If one of the connected devices 24 disconnects from its associated port 20 or its power needs change, the controller can adjust the power delivered to that port and reallocate it to other ports as necessary.

USB PD also supports the delivery of higher power levels compared to standard USB, enabling the powering of more power-demanding devices. It supports power delivery up to 100 W at 20V with cables rated for USB PD. Power delivery occurs in accordance with a power profile. Depending on the capacity of the device and current availability, an upstream device might offer several power profile choices to a downstream device. Generally the higher power profiles are achieved by increasing the voltage. For example, available power profiles might include: 5V@3 A (15 watts); 9V@3 A (27 watts); 12V@3 A (36 watts); 15V@3 A (45 watts); and 20V@4.6 A (92 watts).

Figure 2:
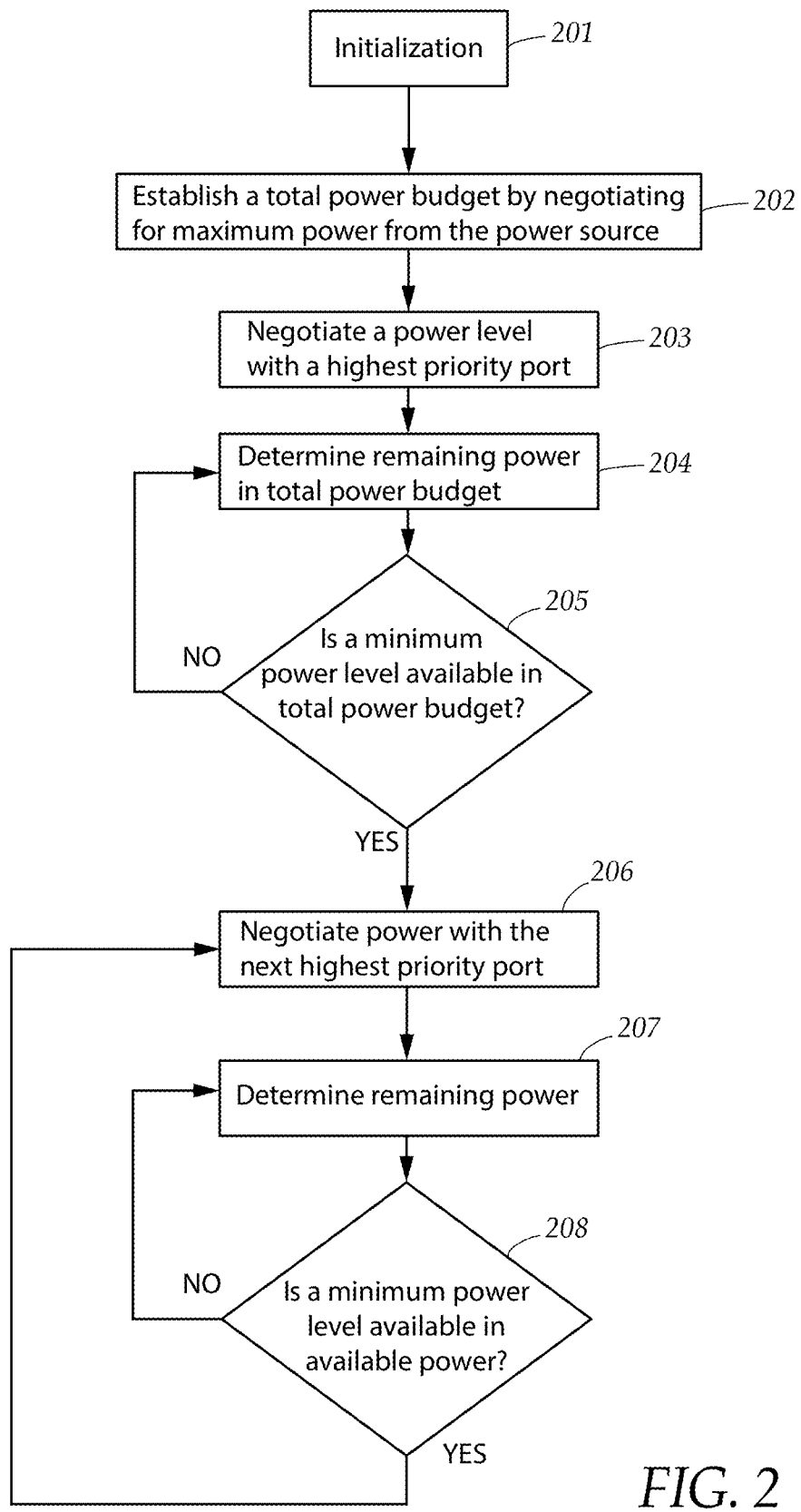
FIG. 2 is a flow diagram, illustrating prioritized power negotiation using the USB PD power negotiation framework.

Referring to FIG. 2, after initialization 201 the common power source enters into a USB Power Delivery (USB PD) negotiation with the controller, requesting maximum power available from the power source, resulting in the establishment of a total power budget 202. This central controller then undertakes downstream USB PD negotiations with the connected devices at each port, determining the power allocation for each port, represented by multiple USB downstream ports. In particular, the controller negotiates and establishes a power level with the highest priority port 203. Then, the remaining power in the total power budget is determined 204. Next it is determined whether a minimum power level is available in the total power budget 205. Said minimum power level is the lowest power profile that can possibly be offered to one of the devices. For example, 3 amps at 5 volts, representing 15 watts of power may be the lowest power profile that can be offered to one of the devices. At step 205, it is determined whether the remaining total power budget can accommodate an additional device at said lowest power profile. In other words: is 15 watts of power available in the remaining total power budget? If the minimum power level is not available in the total power budget at step 205, the system will repeatedly determine remaining power in the total power budget 204, and determine if the minimum power level is available 205, until a minimum power level becomes available. If the minimum power level is available in the total power budget at step 205, the controller will negotiate a power level with the next highest priority port 206. Then, available power will be determined 207, as will whether the minimum power level is available in the total power budget 208, until the minimum power level is available and the controller can negotiate power with the next highest priority port 206. These steps continue until (eventually) the lowest priority port is powered.

The process flow shown in FIG. 2 provides a simplified, high level view of an orderly, prioritized process of power delivery. Note, however, that the entire process as illustrated can occur nearly instantaneously, yet real world changes may occur over a larger time scale. If this process were followed to the letter, the system might get stuck in an endless loop or at least not respond adequately to the change. Accordingly FIG. 2A, 2B, and 2C provide further examples of nuances in the algorithm which may allow the system to respond to environmental changes for smarter management of power delivery.

Figure 2A:
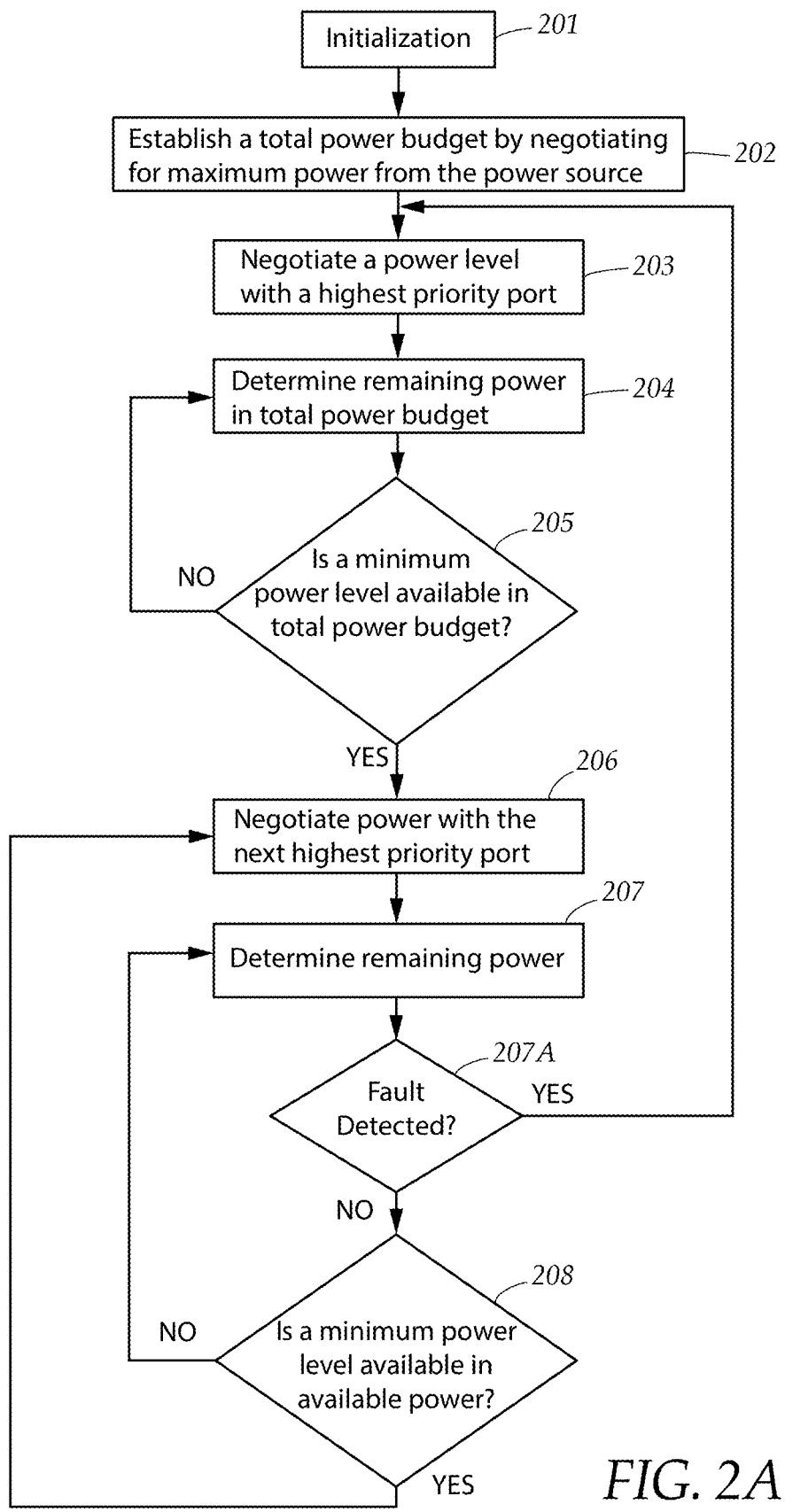
FIG. 2A is a flow diagram, similar to FIG. 2, of an embodiment wherein a detected fault may restart power negotiation from the highest priority port.

In FIG. 2A, for example, the sequence of waiting for remaining power to reach a minimal level 207, 208 so that the next highest priority port can be served 206 is interrupted by a fault detection query 207A. When a fault is detected, a simple solution is to restart all negotiations, starting from the downstream port of highest priority 203.

Figure 2B:
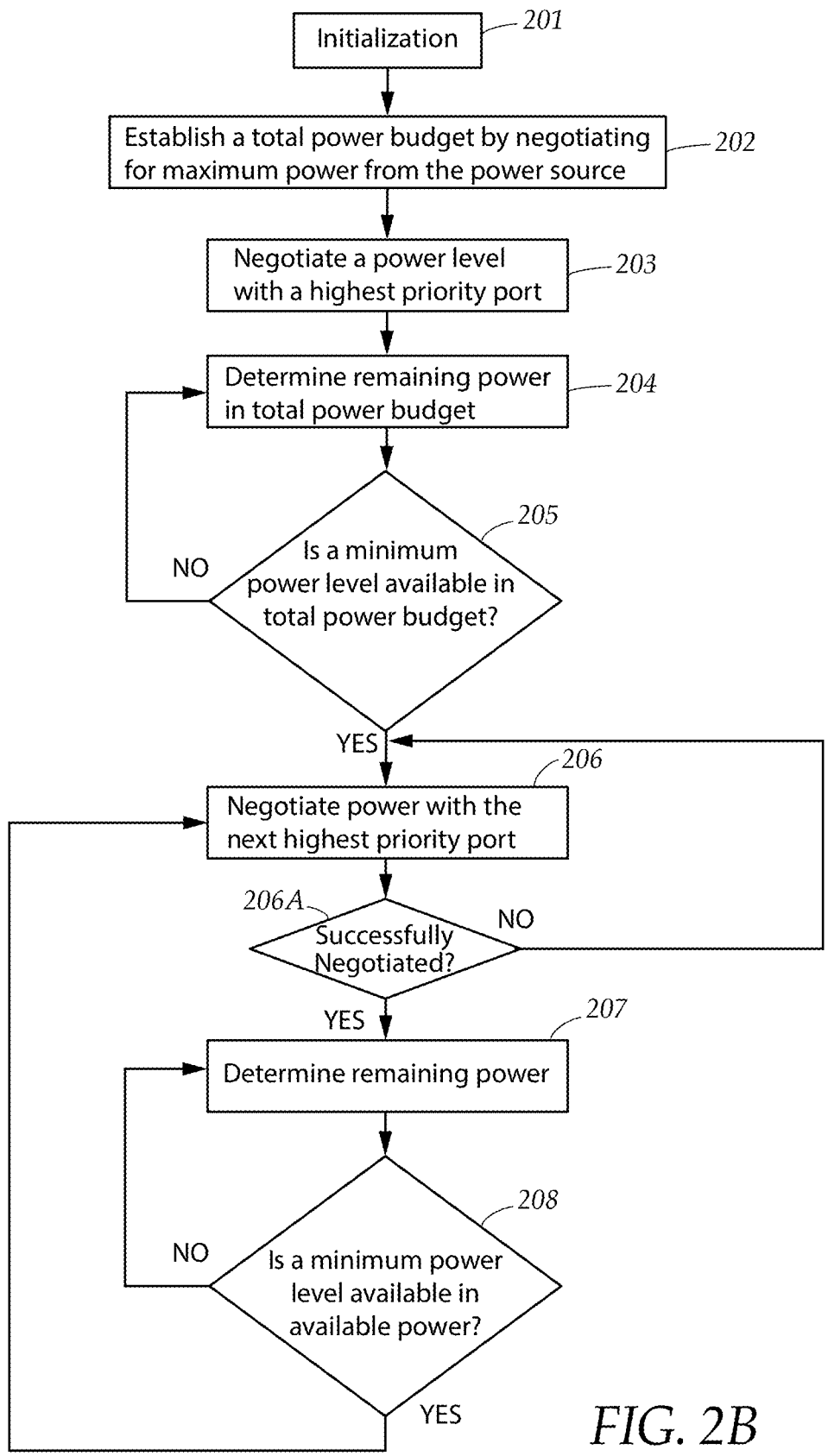
FIG. 2B is a flow diagram, similar to FIG. 2, of an embodiment wherein a failure to agree on an acceptable power profile with a device connected to a port may result in bypassing that port and negotiating with the next highest priority port.

FIG. 2B provides another variation, recognizing a possible scenario where although a minimum power profile is available, and a device is 'next in line', that power profile is insufficient for the minimum power needs of the that device, and is rejected by the device. Rather than wait until more power is available, and leave some remaining power capacity unused, when it is determined that a power contract was not successfully negotiated 206A, that port may be essentially 'skipped', and negotiation is initiated with next highest priority port 206.

Figure 2C:
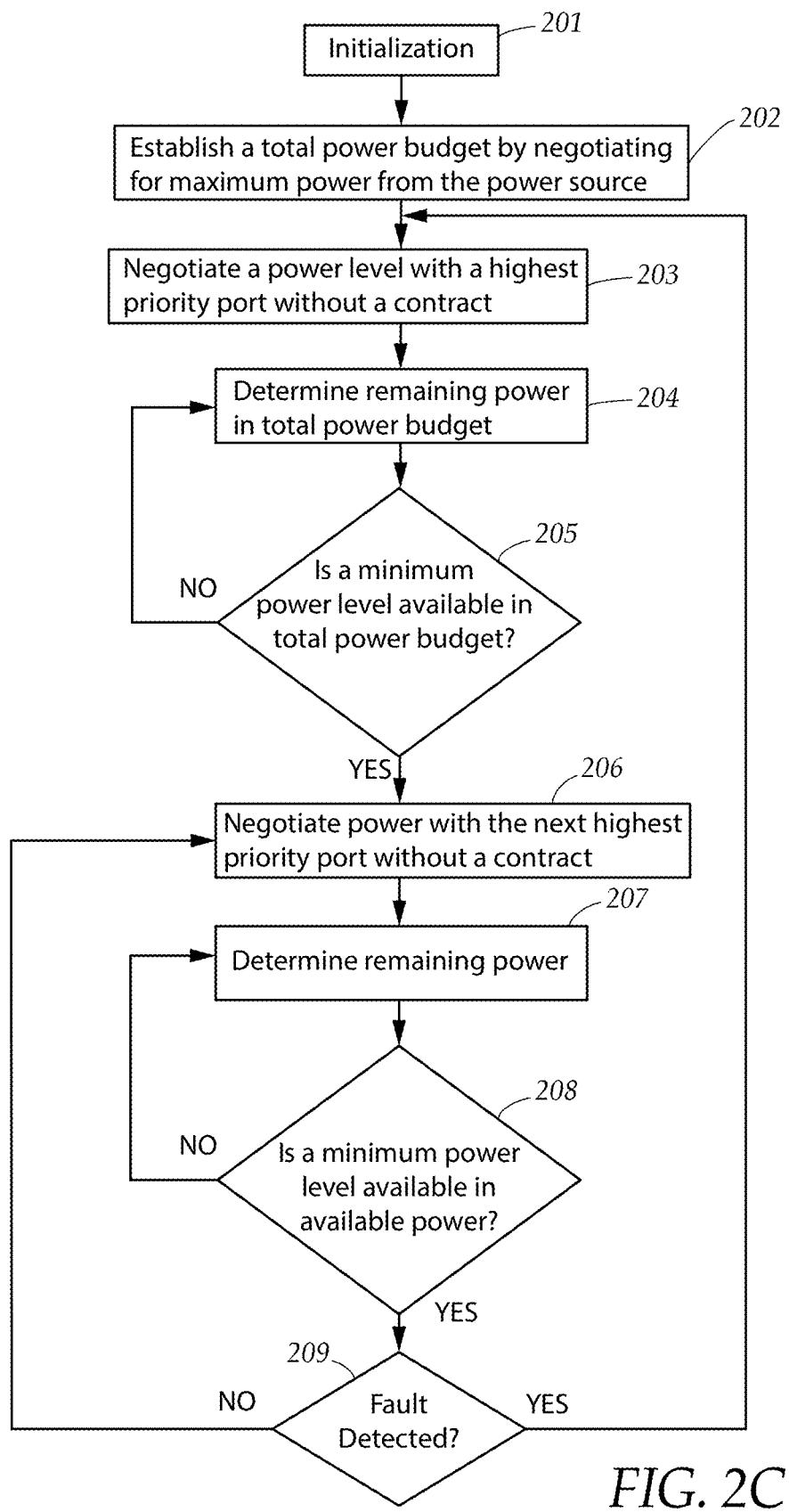
FIG. 2C is a flow diagram, similar to FIG. 2, of an embodiment wherein the highest priority ports without a contracted power profile are served first upon the availability of remaining power in the total power budget.

FIG. 2C provides another variation, recognizing a possible scenario where the system is serving several lower priority ports, and would otherwise be waiting to serve even lower priority ports when a minimal power profile becomes available. However, if for example-initially no device is plugged in to higher priority ports but then a device is plugged in to a high priority port, when minimum power is available 208, rather than serving the next lower priority port, a fault is detected 209. The fault prompts the system to negotiate with the highest priority port without a contract 203, to ensure that the high priority port is served. Negotiation continues with the next highest priority port without a contract 206.

Generally, the controller will initially be unable to power the lowest priority port. Accordingly, it is important to periodically renegotiate with the higher priority ports, or at least reassess their actual power usage, so that power can be made available to lower priority ports. Determination of actual power consumption is an important step to detect available power when additional power is available, yet reliance on the simple calculation of subtracting port power assignments from the total power budget would not allow power that is actually available to be allocated and utilized.

Accordingly, the system is equipped with current sensors 22, 23 to determine actual power draw through each of the ports 20 with the port current sensors 22, and for determining the total power draw with the global current sensor 23. Since the voltage is known by virtue of being determined through the negotiation with said downstream device or with the power source 12, the power can be determined by multiplying the detected current by that known voltage. The voltage is also known because only a handful of predetermined voltage levels exit in the offered profiles that may be offered by one device and accepted by another. These current sensors 22, 23 are thereby capable of measuring the instantaneous total power draw of all downstream ports 20, or of one of the downstream ports 20.

Each current sensor 22, 23 can be implemented using various techniques such as resistive shunt, Hall-effect sensor, or other suitable current sensing technology. The primary objective of these sensors is to provide real-time, accurate measurements of the power being consumed by the connected devices. Power may be reliably determined from the current by multiplying said current with the voltage of the power profile that has been established.

As power is distributed to the connected devices, the current sensors actively monitor the power draw. This provides a continuous stream of data that reflects the real-time power consumption of each device, and more importantly-demonstrates the availability of additional charging capacity that can be readily distributed to unserved ports.

The data from each current sensor is fed back to the central controller. The controller processes this data, enabling it to have a live understanding of how much power each device is drawing and how the total power draw compares to the overall system power budget. In addition, data from the port current sensors, as well detecting the sudden presence or discontinuance of interrogating signals and control signals from downstream devices, can be used to detect new device plug ins, and unplugs.

The ability to sense the actual power draw provides the system with crucial information needed to manage power distribution effectively. It allows for dynamic adjustments to the power allocation per port, ensuring efficient usage of the available power and keeping the system within its power budget.

In summary, the preferred embodiment for per-port current sensing involves the use of dedicated current sensors at each USB port and global current sensing, thereby continuously providing real-time power consumption data to the central controller and enabling the system to dynamically and intelligently manage the delivery of power from the common source until it reaches all of the multiple downstream USB ports.

Per-Port Renegotiation

Once the system-wide power monitoring establishes the real-time power consumption across all ports, the central controller initiates a renegotiation process as needed. The goal of this process is to adapt the power distribution to the dynamic power needs of the devices connected to the USB ports.

Renegotiation is performed using the USB Power Delivery protocol, and can be performed and repeated on a regular cycle and/or in response to detected conditions, such as faults of various kinds. The USB Power Delivery protocol allows for bidirectional communication and negotiation of power levels between the devices and the controller.

The controller continuously compares the total power draw/usage to the total system power budget, established during the initial negotiation with the power source. If the total power draw is approaching the budget limit, the controller may need to decrease the power allocated to one or more ports.

In such a scenario, the controller can engage in a renegotiation with the device(s) consuming higher power. During this renegotiation, the controller advertises a lower power level to the device. Most devices designed to comply with USB PD protocols will then adjust their power consumption to match the newly advertised power level.

Conversely, if the controller determines there is surplus power available within the system power budget—due to a device disconnecting or a device drawing less power than allocated—the controller can increase the power advertised to one or more ports. A renegotiation process is initiated with the chosen device(s), advertising a higher power level. The device(s) then increase their power draw to match the newly advertised level, improving their performance or charging speed.

Per-port renegotiation provides the system with a flexible and dynamic way to adjust power distribution based on the real-time needs of the devices and the available power from the source. It ensures the system remains within its power budget while maximizing the efficient use of available power and optimizing device performance.

When a device's power needs change or when the total power draw approaches the system power budget. The controller may detect a change in the device's power needs through the USB port. It then communicates this change to the device via a USB power delivery (USB PD) negotiation, proposing a new power level or new power profile. The device acknowledges this change and adjusts its power draw accordingly.

Figure 3:
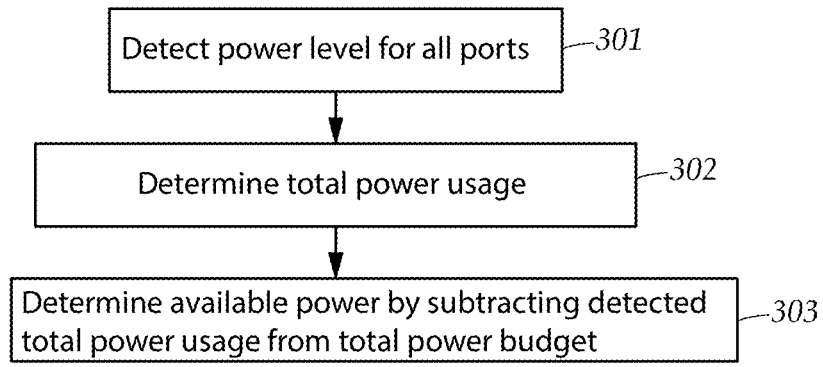
FIG. 3 is a flow diagram, illustrating a sequence of events for dynamically determining when additional power is actually available.
Figure 3A:
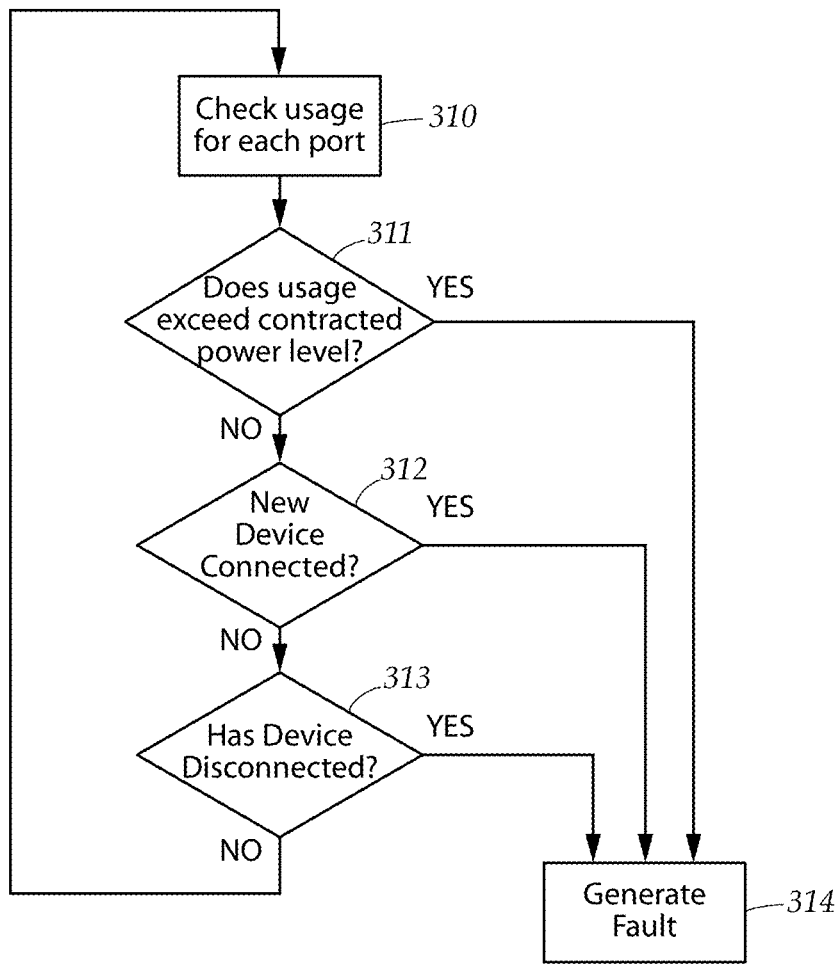
FIG. 3A is a flow diagram, illustrating the repeated monitoring of downstream port current for determining a fault condition.

Referring to FIG. 3A, each downstream USB port is equipped with a current sensor that measures the power draw of the device connected to the port in real-time. The data from these sensors provides a continuous stream of power consumption information for each device. In particular, power usage is checked for each port 310. If usage on one of the ports exceeds the power contract 311, a fault is generated 314. This overcurrent fault may be handled by disabling power to that port (if it is believed that the associated device is misbehaving), re-negotiating power with that port (especially if it is a high priority port) and possibly reducing power to lower priority ports, and may result in renegotiating power delivery to still other ports. If a new device 'plug in' to one of the ports is detected 312, a fault is generated 314. If power is available in the remaining power, it may simply result in negotiating a power delivery contract with that port, it may result in negotiating a contract with that port and then of ports of lower priority, and it may result in revisiting and renegotiating all contracts with all ports starting with the highest priority port, in priority sequence. If a device disconnect is detected 313, a fault is generated 314 that may result in revisiting the availability of remaining power and negotiating with lower priority ports that may be unpowered or underpowered, or it may result in revisiting and renegotiating all contracts with all ports, starting with the highest priority port.

System-Wide Power Monitoring

System-wide power monitoring involves the continuous tracking and processing of the total power consumption across all downstream USB ports. This functionality is critical for maintaining the overall power draw within the capacity of the common power source and for ensuring optimal power distribution.

In the preferred embodiment, system-wide power monitoring is achieved through a combination of current sensing and centralized data processing. Referring to FIG. 3, the controller detects the power level for all ports 301. This can be done with global current sensing or by compiling per-port current sensor data. Global current sensing, however, is the preferred method. With this data, total power usage is determined 302. With the detected current and with the known voltage of the power contract with the power source, the total power usage is easily determined. Then available power (or remaining power budget) can be readily obtained by subtracting the detected total power usage from the total power budget 303.

The controller continuously compares this total power draw to the system power budget, determined through the initial USB Power Delivery negotiation with the power source. This comparison enables the controller to understand whether the system is approaching its power capacity and take appropriate action if needed.

If the total power draw is close to exceeding the system power budget, the controller can trigger a per-port renegotiation process to decrease the power allocated to one or more ports, thereby preventing an overload situation. Conversely, if there is surplus power available within the power budget, the controller can increase the power allocated to one or more ports, thus making better use of the available power.

An exemplative sequence of operation of the system is described as follows:

First—Initialization: The system is powered on, and all components (controller, current sensors at each downstream port, power delivery interfaces) begin operation.

Second—Power Budget Determination: The controller engages in a USB Power Delivery negotiation with the common power source to establish the total system power budget.

Third—Initial Power Distribution: The controller distributes power to each USB port based on initial parameters or evenly across all ports.

Fourth—Real-Time Power Monitoring: Each current sensor associated with the downstream USB ports begins monitoring the power draw of the connected devices, sending this data to the controller.

Fifth—Data Processing: The controller collates and processes the power draw data from all downstream ports, or from a global current sensor on the main bus, determining the actual total power consumption.

Sixth—Comparison with Power Budget: The controller continuously compares the actual total power consumption with the total power budget.

Seventh—Dynamic Power Adjustment: As necessary, periodically, or in response to certain triggering events, the controller initiates a renegotiation process with one or more connected devices, adjusting the power delivered to their respective downstream USB ports to keep the total power draw within the total power budget.

Eighth—Continuous Monitoring and Adjustment: The system continues to monitor and dynamically adjust power distribution, adapting to changes in the power requirements of the connected devices and ensuring optimal power usage within the system power budget.

Priority Charging

Priority Charging addresses the common situation in USB-C power distribution where the combined power demand of downstream devices exceeds the upstream power capability. The system described herein provides a method to allocate power to downstream devices in a manner that is transparent to the user and grants the user control over which devices are prioritized for charging.

Figure 4:
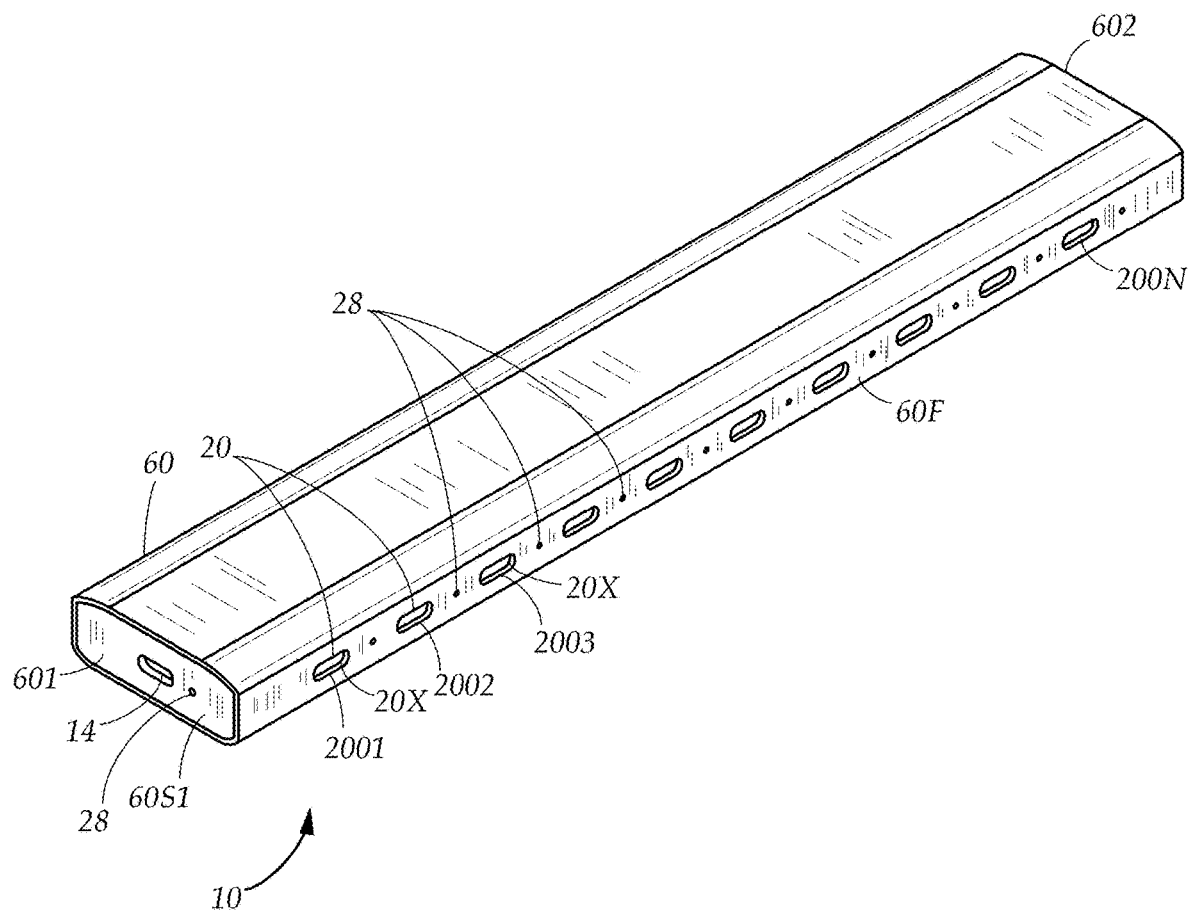
FIG. 4 is a diagrammatic perspective view, illustrating an embodiment of the prioritized power delivery device.
Figure 5:
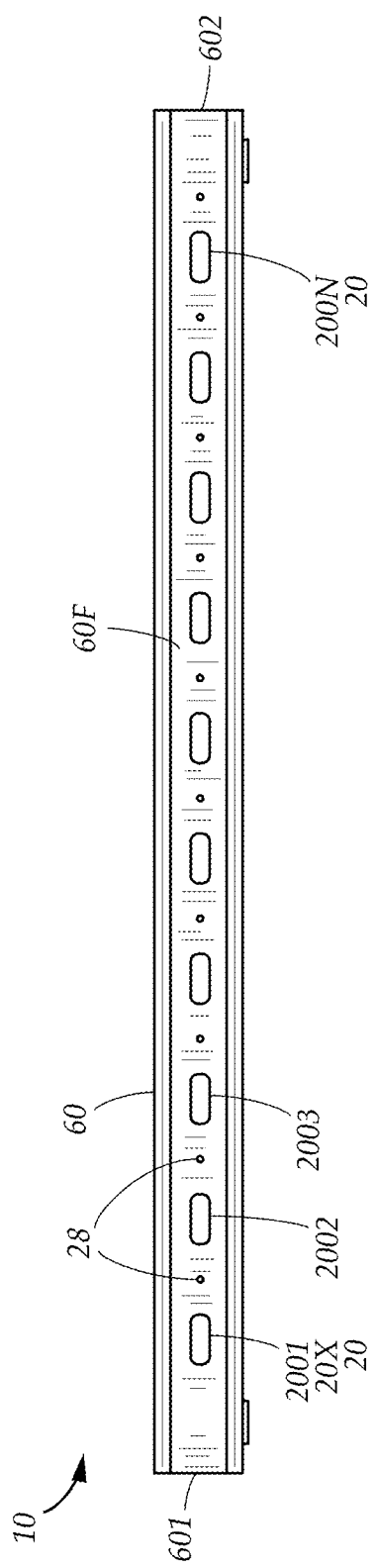
FIG. 5 is front elevational view, illustrating an embodiment of the prioritized power delivery device, with a plurality of output ports.

The core method employed by this system is to prioritize downstream charging ports in a left-to-right sequence. This directionality may be reversed in other example embodiments, or extend from top to bottom, front to back, etc. The key is that the ports are physically arranged in a known order of priority. FIG. 4 and FIG. 5 shows the power delivery device 10 externally, having a housing 60 with a first side 601 (or left side in this embodiment) and a second side 602 (right side). The housing 601 has a first side panel 60S1 at the first side 601, and a front panel 60F perpendicular thereto, where all downstream ports 20 are physically arranged in priority order on said front panel 60F. Each of the downstream ports 20 has a port opening 20X on the front panel 60F to allow connection to one of the devices. On the front panel 60F, the port opening 20X of the highest priority port 2001 is near the first side 601 and the port opening 20X of the lowest priority port 200N is near the second side 602. Additional ports such as the second highest priority port 2002, and third highest priority port 2003 are located in sequence therebetween. Note that in this example, there are ten downstream ports 20. Accordingly, the lowest priority port 200N may also be considered the tenth highest priority. The input port 14 is on the first side panel 60S1, where the power supply is connected. After the power delivery device 10 negotiates for maximum power to be provided by the power supply, the highest priority (leftmost) downstream port 2001 is offered a USB-C Power Delivery (PD) contract utilizing the full capabilities of the power source. This contract is negotiated with the device connected to said highest priority port 2001, to determine the maximum power that can be allocated to the device based on its requirements and the power source's capacity. After establishing the power contract with the highest priority port 2001, the remaining available power is offered to the next highest priority port 2002, immediately to the right. This process continues port by port, left to right (in this embodiment), until all available power is allocated or there are no more devices connected to the downstream ports 20 to negotiate with and serve.

As devices typically draw more power when their batteries are low and less power as they approach full charge, the system of the present disclosure dynamically reallocates power. When a device's charging rate slows, additional power is freed up. The system monitors the power draw of each device in real-time through current sensing, reallocating freed-up power to the next lower priority ports (toward the right). This ensures that as device connected to higher priority ports (on the left) complete their charging, subsequent ports receive power for their devices.

Over time, especially in overnight scenarios, the system ensures that all ports receive sufficient power to charge their connected devices. This approach allows for effective use of available power, ensuring that no device is left without charge for extended periods. Users are provided with a clear understanding of the power distribution hierarchy (e.g. left-to-right prioritization). The system may include a user interface that displays the charging status and priority of each port. In particular, status LEDs 28 are provided on the front panel 60F, and also adjacent to the input port 14 on the side panel 60S1. Having such a visual indicator of charging status, allows users to manage and prioritize their devices as needed. For example, they may physically change the port that certain devices are connected to, moving them further to the left to a higher priority port, to give the device higher charging priority.

The primary management objective of the prioritized power delivery device 10 is to allow a user to have all of their devices plugged in, queued to charge, while managing the total power draw from all USB ports without exceeding the system's total power budget. By continuously monitoring and dynamically adjusting power allocations, the system maintains efficient power distribution tailored to the needs of each connected device. This results in improved energy efficiency and optimized performance, ensuring that all devices are adequately charged within the available power constraints.

Figure 6:
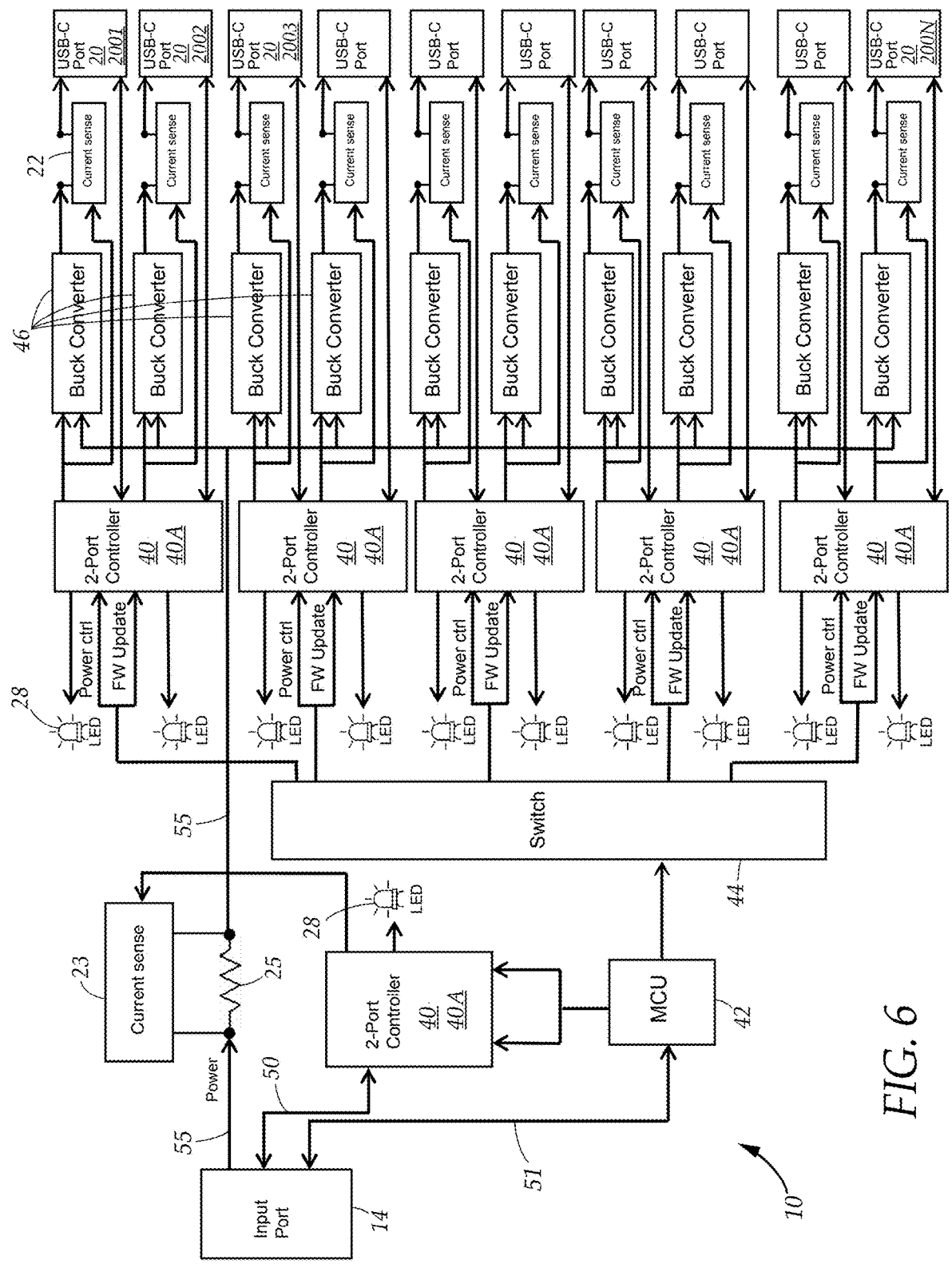
FIG. 6 is a schematic diagram, illustrating the functional interconnection of components of an embodiment of the power management system.

FIG. 6 is a schematic for an embodiment of the priority power delivery system 10, having the input port 14, multiple downstream ports 20, and with the functionality as described. Note that FIG. 6 displays an example implementation that is consistent with FIG. 1, but more granular. The major components are described as follows:

The input port 14 is generally a USB-C port that allows connection to the power supply. The power supply is preferably a USB-C power supply, capable of delivering maximum power possible under the current USB spec.

The system employs a plurality of two-port controller chips 40, including an upstream two-port controller chip 40A, and a plurality of downstream two-port controller chips 40B. An example of a suitable two-port controller is the PD 3.0 Controller chip from Cypress, CYPD4226. Each two-port controller chip manages power delivery (PD) and data transfer for two USB-C ports. "PD 3.0" refers to the USB Power Delivery 3.0 specification which supports higher power capacities for charging and more flexible power management. These controller chips 40 handle the negotiation for power levels in accordance with the PD 3.0 specification as well as manage the direction of power flow. PSU CC1/CC2 lines 50 are connected between the input port 14 and the upstream controller chip 40A. The PSU CC1/CC2 lines 50 refers to communication channel pins from the input port 14, with CC1 and CC2 indicating the communication channel pins on the USB-C connector used for power delivery negotiation in accordance with the USB PD 3.0 spec.

A microcontroller or MCU 42 serves as a centralized controller for the charger 10. It may be tasked with managing the communication between the various components, handling firmware updates, overall operation logic for the hub, and providing the functionality of the power management device as described herein. A suitable controller is available as part AT32F415RCT7. USB 2.0 lines 51 connect the Input port 14 to the MCU 42.

A multiplexer or switch 44 is provided for multiplexing I2C lines from the MCU 42 to share them with the plurality of downstream two-port controller chips 40B. In the example shown, a 1 to 8 multiplexer chip is employed and connects the I2C lines with five two-port controllers 40B. A suitable multiplexer chip is available as part PI4MSD5V9547. The multiplexer allows the microcontroller 42 to communicate with multiple I2C devices over the same bus without address conflicts. Since the schematic shows multiple devices that may use the same I2C addresses, the switch 44 ensures that communications are routed to the correct device.

A plurality of buck converters 46 are employed-generally one per downstream USB-C output port 20, each connected to a main power bus 55 emanating from the input port 14. The buck converters 46 are DC converters and each are capable of providing a voltage step down, to provide the appropriate voltage to its associated downstream output port 20. A suitable example of the buck converter 46 is the MP8856 chip, which is an integrated buck converter with a synchronous rectifier designed for high-efficiency voltage step-down.

The current sensing devices 22, 23 may be part RTQ6053QV, which effectively measures the current by measuring voltage drop across a current sense resistor 25 associated which each of said devices 22, 23. The data provided by this chip is important for power management and safety to ensure that devices are not drawing more power than the hub can provide. In particular, the global current sensing device 23 measures the total current flowing from the power input 14 on the main power bus 55. In addition, in the embodiment shown, port current sensing devices 22 are associated with each downstream port 20, at the output of the buck converter 46 associated with said downstream port 20, and measure the current flowing thereto.

A plurality of status LEDs 28 are provided and may indicate power status, charging status, and fault conditions. Preferably dual or multicolor LEDs are employed to convey a plurality of different statuses. One of the status LEDs 28 is associated with each of the downstream ports 20 and is connected to the downstream two-port controller 40B associated with said port 20. Another of the status LEDs 28 is associated with the upstream two-port controller 40A. As a non-limiting example, with a Red/Blue dual color LED: for the LEDs 28 associated with the downstream ports 20, red might indicated an overcurrent condition, blue blinking may indicate that charging is in progress, blue steady might indicate that charging is completed, and purple might indicate that said port is on standby and is waiting for charging to take place. With regard to the LED 28 associated with the upstream two-port controller 40B, red might indicate that the power source is not PD 3.0 compliant or can only provide less than a threshold power requirement (for example, 18 W), blue might indicate normal activity (for example, between 18 W and 100 W being delivered by the power source), and purple may indicate that the power source is currently at full load.

In the embodiment shown, the input port 14 receives power and data, which the upstream two-port controller manages. The MCU 42 controls the overall operation, including firmware updates through I2C communication. The switch 44 multiplexes the I2C communications to multiple downstream two-port controllers 40B and expands the number of devices that can be managed by the MCU 42 on the same I2C bus. Each USB-C downstream output port 20 has an associated buck converter 46 to provide the correct voltage and power based on the two-port controller negotiation. Current sensing circuits 22, 23 provide feedback on the power usage for safety and control. The LEDs 28 serve as visual feedback for the status of each downstream port 20.

In particular, the upstream two-port controller 40A maintains communication with the power source 12 (see FIG. 1) on behalf of the microcontroller. In general, the upstream two-port controller 40A will seek the maximum power (maximum voltage) that the power source 12 (see FIG. 1) can provide, and then provide that power/voltage on the main power bus 55 to all of the buck converters 46. The downstream two-port controllers 40B negotiate with the microcontroller 42, through the I2C lines, and through the switch 44. When instructed by the microcontroller 42 to provide power to one of the downstream ports 20, at a negotiated power level (an established power delivery contract), the associated downstream two-port controller 40B instructs the associated buck converter to step down the voltage from the main power bus 55 to the voltage associated with the negotiated power profile) for output on said downstream port 20.

The ports are prioritized, such that initially, power may only be available to one or two of the highest priority ports. As power consumption by said ports drops to below the negotiated level, the current sensing data will reflect that less than the power level negotiated with the power supply is being used. That power is then allocated to the next priority output port(s).

This schematic may be part of a larger system distributing power and data to multiple USB-C ports. The design would allow a single USB-C connection from a host (like a laptop or a smartphone) to be expanded to several ports, each capable of handling power delivery and data transfer according to the specifications of the connected devices. Note that FIG. 6 is intended to be consistent with the simplified block diagram of FIG. 1. In particular, the functionality simplistically attributed to the controller 30 in FIG. 1 is provided in the example of FIG. 6 by the two-port controllers 40A, 40B, the MCU 42, the switch 44, and the buck converters 46.

Figure 7:
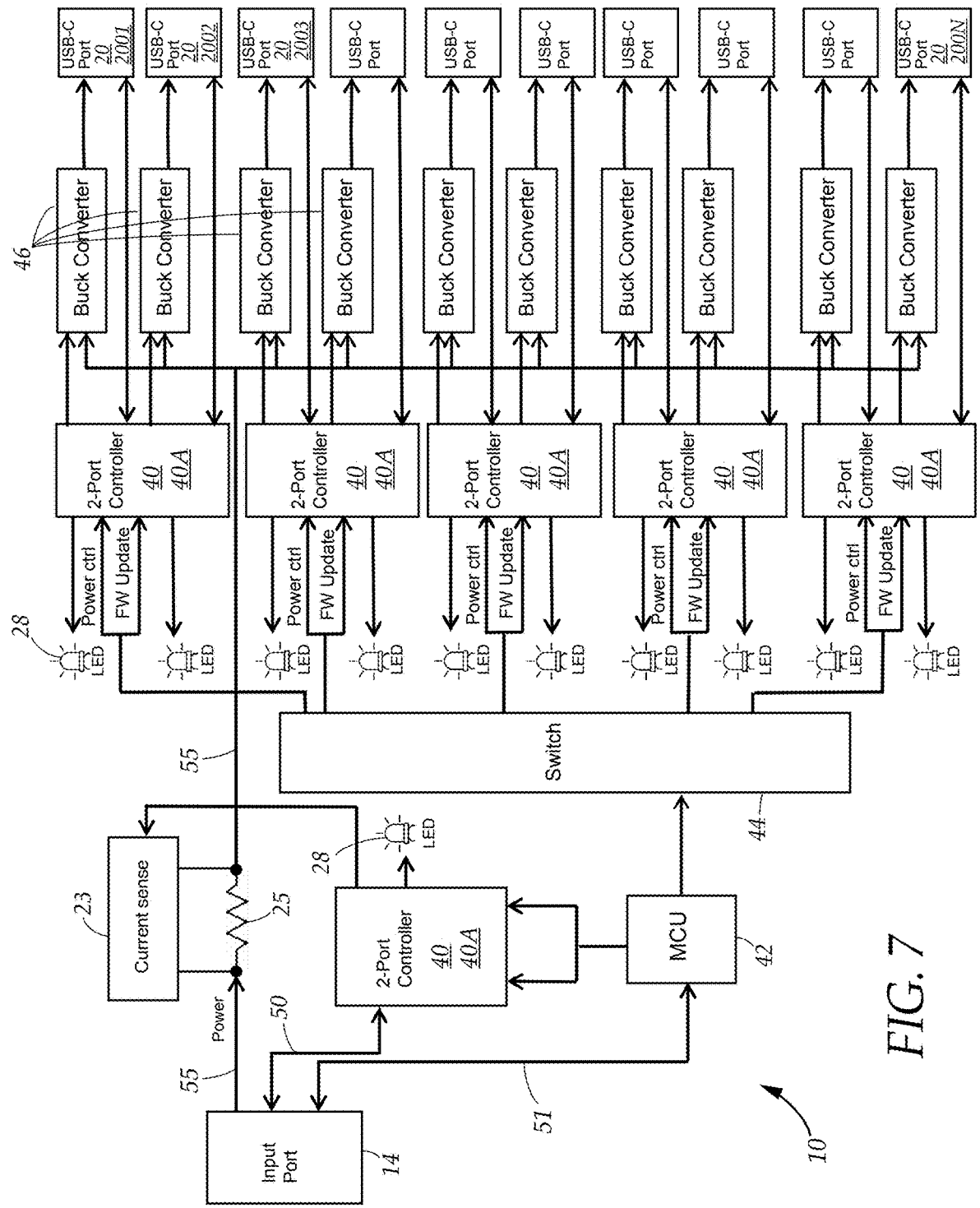
FIG. 7 is a schematic diagram, similar to FIG. 6, except without port current sensing.

FIG. 7 shows another embodiment of the priority power delivery device 10 wherein individual current sensing on the downstream ports 20 is not provided. Much of the functionality described herein may still be provided. While isolating which specific port has dropped its power consumption is more difficult, the global current sensor 23 is employed to determine when power consumption has dropped sufficiently to allow other devices to charge.

In summary, system-wide power monitoring is implemented through a combination of port prioritization, current sensing, and centralized data processing. This functionality enables the system to maintain its total power draw within the established power budget, ensuring efficient power distribution and optimal performance of the connected devices.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a system and method of intelligent power distribution which allows for dynamic renegotiation of power allocated to individual ports by current sensing of individual ports as well as system wide monitoring The disclosure is illustrated by example in the drawing figures, and throughout the written description. It should be understood that numerous variations are possible, while adhering to the inventive concept. Such variations are contemplated as being a part of the present disclosure.

What is claimed is:

1. A prioritized power delivery device, for connecting with a power supply, and providing prioritized power to multiple devices, comprising:
   a plurality of downstream ports, the ports physically arranged in priority order from highest priority port to lowest priority port, each port adapted for connecting to one of the multiple devices;
   an input port, adapted for connecting to the power supply;
   a controller, for requesting maximum power from the power supply and thereby establishing a total power budget, and for coordinating negotiation with devices when connected to the ports for a power profile that is within the total power budget and is acceptable to the device, such that negotiation occurs first with the highest priority port that is connected to one of the devices, and when power is still available in the total power budget, for negotiating with lower priority ports in priority order;
   a global current sensor, in communication with the input port, for measuring actual power being provided by the power supply so that the controller can determine when power is available within the total power budget and negotiate with at least one of the ports to allocate said power available within the total power budget; and
   a plurality of port current sensors, one of said plurality of port current sensors associated with each downstream port, for determining the actual current flowing to said downstream port and thereby determining the actual power being utilized by one of the devices connected to said downstream port, wherein in response to said determined power at one of said downstream ports, the controller may perform one of disabling said downstream port, renegotiating for a new power profile with said downstream port, and negotiating with another of the downstream ports that is lower priority than said downstream port.

2. The prioritized power delivery device as recited in claim 1, further comprising a housing, having a front panel having a first side and an opposite second side, and wherein the downstream ports each have a port opening for connecting one of the devices, and wherein the downstream ports are arranged on the front panel with the port opening of the highest priority port located near the first side, the port opening of the lowest priority port near the second side, and wherein the port openings of the other downstream ports provided in priority order between the highest priority port and lowest priority port.

3. The prioritized power delivery device as recited in claim 2, further comprising a status indicator associated with each of the ports, the status indicator providing visual feedback as to whether power is being provided to said port, such that a user can selectively reconnect one of the devices into a higher priority port to ensure that said device receives power.

4. The prioritized power delivery device as recited in claim 1, wherein the controller further comprises a microcontroller for coordinating the overall functionality of the power delivery device, an upstream two-port controller connected to the input port for negotiating with the input source, a plurality of downstream two-port controllers each connected with at least one of the downstream ports for negotiating with said downstream ports; and a switch that is connected between the microcontroller and downstream two-port controllers for allowing the microcontroller to coordinate negotiations by said downstream two-port controllers with the downstream ports associated therewith.

5. The prioritized power delivery device as recited in claim 4, further comprising a plurality of buck converters, each buck converter associated with one of the downstream ports, each buck converter for providing a voltage to said associated downstream port that is consistent with a power profile that has been negotiated with said downstream port.

6. A prioritized power delivery method, for powering multiple external connected devices from a power source, using a power delivery device having a housing, an input port, a plurality of downstream ports that are physically arranged on the housing from a highest priority downstream port to a lowest priority downstream port, a global current sensor and a plurality of port current sensors, one of said port current sensors associated with each of the downstream ports, one of said port current sensors associated with each of the downstream ports and a controller, comprising the steps of:
(a) plugging the power source into the input port;
(b) establishing a total power budget by negotiating with the power source a power profile that is the highest available power profile of the power source;
(c) plugging a plurality of connected devices into the downstream ports;
(d) negotiating a power delivery contract with the device connected to the highest priority port;
(e) determining the remaining power available in the total power budget by detecting actual total power usage by measuring the at least one current sensor, and calculating remaining power by subtracting actual total power usage from the total power budget;
(f) negotiating a power delivery contract with the device connected to the next highest priority port when sufficient power is remaining in the total power budget to provide a minimal power profile wherein upon detecting current from one of the current sensors that exceeds the power delivery contract of the associated downstream port, the controller performs at least one of disabling said downstream port, renegotiating for a new power profile with said downstream port, and negotiating with another of the downstream ports that is lower priority than said downstream port;
(g) repeating step (e) and (f); and
wherein upon detecting current from one of the port current sensors that exceeds the power delivery contract of the associated downstream port, the controller performs at least one of disabling said downstream port, renegotiating for a new power profile with said downstream port, and negotiating with another of the downstream ports that is lower priority than said downstream port.

7. The prioritized power delivery method as recited in claim 6, further comprising the steps of determining that power consumption by one of the connected devices connected to a downstream port has dropped to a level lower than previously negotiated, and then negotiating with a device connected to a port of lower priority than said port to allocate power to said lower priority port.

* * * * *